(12) United States Patent
Spracklen et al.

(10) Patent No.: US 7,827,383 B2
(45) Date of Patent: Nov. 2, 2010

(54) EFFICIENT ON-CHIP ACCELERATOR INTERFACES TO REDUCE SOFTWARE OVERHEAD

(75) Inventors: Lawrence A. Spracklen, Boulder Creek, CA (US); Santosh G. Abraham, Pleasanton, CA (US); Adam R. Talcott, Los Altos, CA (US)

(73) Assignee: Oracle America, Inc., Redwood City, CA (US)

( * ) Notice: Subject to any disclaimer, the term of this patent is extended or adjusted under 35 U.S.C. 154(b) by 731 days.

(21) Appl. No.: 11/684,358

(22) Filed: Mar. 9, 2007

(65) Prior Publication Data

US 2008/0222383 A1 Sep. 11, 2008

(51) Int. Cl.
G06F 9/34 (2006.01)
G06F 12/08 (2006.01)

(52) U.S. Cl. .......................... 711/214; 711/1; 711/203; 711/E12.058; 710/4; 712/34

(58) Field of Classification Search .................. 711/151, 711/1, 203, 214; 710/3–5, 28, 36, 37; 712/34, 712/35
See application file for complete search history.

(56) References Cited

U.S. PATENT DOCUMENTS

| | | | |
|---|---|---|---|
| 4,779,188 A * | 10/1988 | Gum et al. ...................... 718/1 |
| 6,538,650 B1 * | 3/2003 | Prasoonkumar et al. ..... 345/419 |
| 2002/0062459 A1 | 5/2002 | Lasserre et al. |
| 2003/0028751 A1 * | 2/2003 | McDonald et al. ............. 712/34 |
| 2004/0128507 A1 * | 7/2004 | McKenney et al. ......... 713/170 |
| 2004/0160835 A1 * | 8/2004 | Altman et al. ............... 365/200 |
| 2004/0237062 A1 | 11/2004 | Zeidman et al. |
| 2005/0228936 A1 | 10/2005 | Kuo et al. |
| 2005/0257186 A1 | 11/2005 | Zilbershlag |
| 2006/0056517 A1 | 3/2006 | MacInnis et al. |
| 2006/0200802 A1 * | 9/2006 | Mott et al. ................... 717/120 |
| 2006/0230213 A1 | 10/2006 | Tousek et al. |
| 2007/0061547 A1 * | 3/2007 | Jordan et al. ................. 711/207 |
| 2007/0061548 A1 * | 3/2007 | Jordan et al. ................. 711/207 |
| 2007/0067543 A1 | 3/2007 | Fujise et al. |
| 2007/0143287 A1 * | 6/2007 | Adl-tabatabai et al. ......... 707/8 |
| 2007/0157211 A1 | 7/2007 | Wang et al. |
| 2008/0104362 A1 * | 5/2008 | Buros et al. .................. 711/207 |

OTHER PUBLICATIONS

U.S. Appl. No. 11/684,348, filed Mar. 9, 2007.

(Continued)

*Primary Examiner*—Shane M Thomas
(74) *Attorney, Agent, or Firm*—Lawrence J. Merkel; Meyertons, Hood, Kivlin, Kowert & Goetzel, P.C.

(57) ABSTRACT

In one embodiment, a processor comprises execution circuitry and a translation lookaside buffer (TLB) coupled to the execution circuitry. The execution circuitry is configured to execute a store instruction having a data operand; and the execution circuitry is configured to generate a virtual address as part of executing the store instruction. The TLB is coupled to receive the virtual address and configured to translate the virtual address to a first physical address. Additionally, the TLB is coupled to receive the data operand and to translate the data operand to a second physical address. A hardware accelerator is also contemplated in various embodiments, as is a processor coupled to the hardware accelerator, a method, and a computer readable medium storing instruction which, when executed, implement a portion of the method.

18 Claims, 8 Drawing Sheets

OTHER PUBLICATIONS

Mackerras, et al., "Operating System Exploitation of the POWER5 System," IBM, Sep. 2005, vol. 49, No. 4/5, pp. 533-539.
Kongetira, et al., "Niagara: A 32-Way Multithreaded Sparc Processor," IEEE, 2005, pp. 21-29.
Keromytis, et al., "The Design of the OpenBSD Cryptographic Framework," Proc. USENIX Technical Conference 2003, 16 pages.
Lindemann, et al., "Improving DES Coprocessor Througput for Short Operations," Proc. USENIX Security Symposium, 2001, 15 pages.
Office action from U.S. Appl. No. 11/684,348 mailed Sep. 21, 2009.
Office action from U.S. Appl. No. 11/684,348 mailed Mar. 29, 2010.

* cited by examiner

EFFICIENT ON-CHIP ACCELERATOR INTERFACES TO REDUCE SOFTWARE OVERHEAD

BACKGROUND

1. Field of the Invention

This invention is related to processor-based systems having hardware accelerators.

2. Description of the Related Art

Hardware accelerators are often included in processor-based systems such as computer systems to perform specific, predefined tasks in hardware rather than in software. Work is offloaded from the processors to the hardware accelerators, permitting them to work in parallel on other tasks. Even if no other task is available for the processors to work on, the higher performance of the hardware accelerator performing the defined tasks can still result in a performance increase. For example, if the software execution of the task requires X cycles and the hardware accelerator execution of the task requires Y cycles, where Y is less than X and often much less than X, the performance gain is X/Y (without accounting for software overhead in dispatching the task to the accelerator). Additionally, in some cases, the hardware acceleration can be more power-efficient than performing the same tasks in software. Power efficiency can be even greater if the hardware accelerators are incorporated on the same semiconductor substrate ("on-chip") as the processors. Particularly, integrating hardware accelerators onto multi-core chips such as chip multiprocessors (CMP) and/or chip multithreaded (CMT) processors can be efficient, because the accelerator can be shared among the cores/threads.

Currently, there is a large amount of software overhead associated with dispatching a task to a shared hardware accelerator (e.g. on the order of tens of thousands of processor clock cycles). Access to the hardware accelerator is typically managed by the lowest-level and most-privileged layer of software in the system. Managing access in this fashion helps ensure that the hardware accelerator is shared in a secure fashion (preventing one thread/core from disrupting, and particularly corrupting, the task issued by another thread/core to the hardware accelerator), and also in a fair fashion so that various threads/cores have the opportunity to take advantage of the hardware accelerator. The OS can implement the fairness and security in a non-virtualized environment. In a virtualized environment, the Hypervisor implements the fairness and security. Typically, the overhead incurred is as follows: the application transmits a task request to the operating system (OS); the OS copies the data to be processed from the user-space to the kernel space; the OS forwards the request to the Hypervisor; the Hypervisor programs the accelerator to perform the task and awaits completion; the Hypervisor passes the completion to the OS; the OS copies the results from kernel space to user-space; and the OS informs the application that the task is complete. Accordingly, much of the overhead is consumed in copying the data back and forth between user space and kernel space, as well as the communications between the OS and the Hypervisor.

The size of the software overhead limits the usefulness of the hardware accelerator to those tasks for which the performance gain of using the hardware accelerator is in the tens of thousands of clock cycles or greater. Since the software overhead is experienced for every task issued to the hardware accelerator, the size of each individual task must be large enough to compensate for the software overhead. Not all tasks meet these requirements. For example, bulk encryption in web servers can be expected to be a large task overall, which could greatly benefit from hardware acceleration. However, each packet to be encrypted is relatively small, and the cost of the software overhead would be prohibitive.

SUMMARY

In one embodiment, a processor comprises execution circuitry and a translation lookaside buffer (TLB) coupled to the execution circuitry. The execution circuitry is configured to execute a store instruction having a data operand; and the execution circuitry is configured to generate a virtual address as part of executing the store instruction. The TLB is coupled to receive the virtual address and configured to translate the virtual address to a first physical address. Additionally, the TLB is coupled to receive the data operand and to translate the data operand to a second physical address.

In an embodiment, a hardware accelerator is coupled to receive an indication of a translation lookaside buffer (TLB) invalidation from a processor to which the hardware accelerator is couplable (i.e. the hardware accelerator is capable of being coupled to the processor). The hardware accelerator comprises a physical address buffer configured to store one or more physical addresses corresponding to memory locations being accessed by the hardware accelerator; and accelerator execution circuitry coupled to the physical address buffer. The accelerator execution circuitry is configured to perform one or more tasks assigned to the hardware accelerator, and is also configured to transmit an acknowledgement in response to the TLB invalidation indication. The accelerator execution circuitry is configured to transmit the acknowledgement responsive to invalidating physical addresses in the physical address buffer that are affected by the TLB invalidation.

In one embodiment, a method comprises: executing a store instruction having a data operand, wherein the executing comprises generating a virtual address; translating the virtual address to a first physical address; and selectively translating the data operand to a second physical address.

BRIEF DESCRIPTION OF THE DRAWINGS

The following detailed description makes reference to the accompanying drawings, which are now briefly described.

Figure 1:
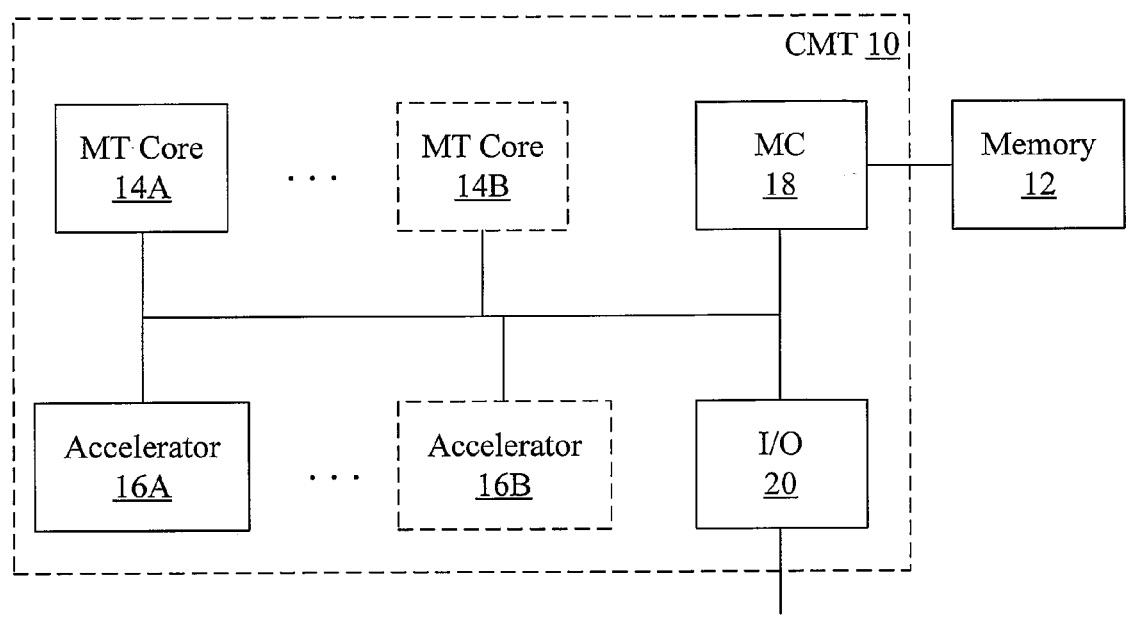
FIG. 1 is a block diagram of one embodiment of a chip multi-threaded (CMT) device including a hardware accelerator.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 is a block diagram of one embodiment of a chip multithreaded (CMT) device 10 coupled to a memory 12. Specifically, in the illustrated embodiment, the CMT 10 comprises at least one multithreaded (MT) core 14A and at least one hardware accelerator 16A. In some embodiments, there may be multiple MT cores, such as MT core 14B, and/or multiple hardware accelerators, such as hardware accelerator 16B. The CMT 10 also includes a memory controller 18 and an input/output (I/O) interface circuit 20. In various embodiments, more than one memory controller 18 and/or I/O interface circuit 20 may be included. The MT cores 14A-14B, the hardware accelerators 16A-16B, the memory controller 18, and the I/O interface circuit 20 are coupled. The memory controller 18 is further coupled to the memory 12, and the I/O interface circuit 20 is coupled to an external I/O interface to couple to one or more I/O devices.

The MT cores 14A-14B are each configured to execute instructions defined in an instruction set architecture implemented by the MT cores 14A-14B. That is, the MT cores 14A-14B each comprise circuitry configured to execute instructions. As the name implies, the MT cores 14A-14B may be multithreaded. That is, the cores may include circuitry to support multiple active threads in the cores 14A-14B at the same time. The cores may select available instructions from different active threads for execution without the intervention of software. Generally, a thread may comprise a sequence of instructions that is defined as an executable unit and that may be executed in parallel with other threads. Threads may have dependencies on each other (e.g. they may communicate with each other through a defined mechanism such as memory semaphores) or may be independent. Threads may be grouped to perform a defined function, and the threads may be a process. One or more processes may form an application. Thus, an application may comprise one or more threads. Similarly, an OS or Hypervisor may comprise one or more processes, each of which may comprise one or more threads.

The MT cores 14A-14B may implement any desired microarchitecture (scalar, superscalar, pipelined, speculative, in-order, out-of-order, etc.). While MT cores 14A-14B are used in this embodiment, other embodiments may not implement a CMT 10 and may include discrete processing circuitry or any other level of integration with other components. Generally, the term processor may refer to any processing circuitry, including MT cores and other embodiments. The MT cores will be used as an example herein, but other embodiments may use other processor implementations.

The hardware accelerators 16A-16B may each comprise circuitry that implements a task or tasks in hardware. Generally, the hardware accelerator 16A-16B may be controlled by software to perform a task on input data to produce output data that can be read by software. For example, the hardware accelerator 16A-16B may be configured to accept commands generated by software that identify the desired task, the source data, and the result location. The tasks for which a given hardware accelerator is designed may vary from embodiment to embodiment, across a wide variety of operations. For example, embodiments are contemplated in which the hardware accelerators 16A-16B implement cryptographic tasks (e.g. encryption or decryption), extensible markup language (XML) processing tasks, network processing tasks, etc. If multiple hardware accelerators are provided, different accelerators may implement different tasks, and/or two or more accelerators may implement the same task, as desired.

The memory controller 18 comprises the circuitry to interface to the memory 12. Various types of memory may be supported by the memory controller 18. For example, static random access memory (SRAM), dynamic RAM (DRAM), synchronous DRAM (SDRAM), double data rate SDRAM (DDR SDRAM), DDR2, Rambus DRAM (RDRAM), etc. may be supported.

The I/O interface circuit 20 may bridge between the CMT 10 and one or more I/O interfaces. For example, the I/O interfaces may include the peripheral component interconnect (PCI), PCI Express (PCIe), HyperTransport, Infiniband, etc.

The MT cores 14A-14B, the hardware accelerators 16A-16B, the memory controller 18, and the I/O interface circuit 20 may be coupled in any desired fashion. A shared bus may be used, a packet interface may be used, etc. A hierarchical, indirect coupling may be used. In one embodiment, the CMT 10 may include a level-2 (L2) cache comprising a plurality of banks, and the MT cores 14A-14B may be coupled to the banks through a crossbar structure. The accelerators 16A-16B, the memory controller 18, and the I/O interface circuit 20 may be coupled to the L2 cache as well.

The CMT 10 may comprise a single semiconductor substrate integrating the components shown in the CMT 10. Alternatively, other levels of integration and/or discrete circuitry may be used in other embodiments.

Figure 2:
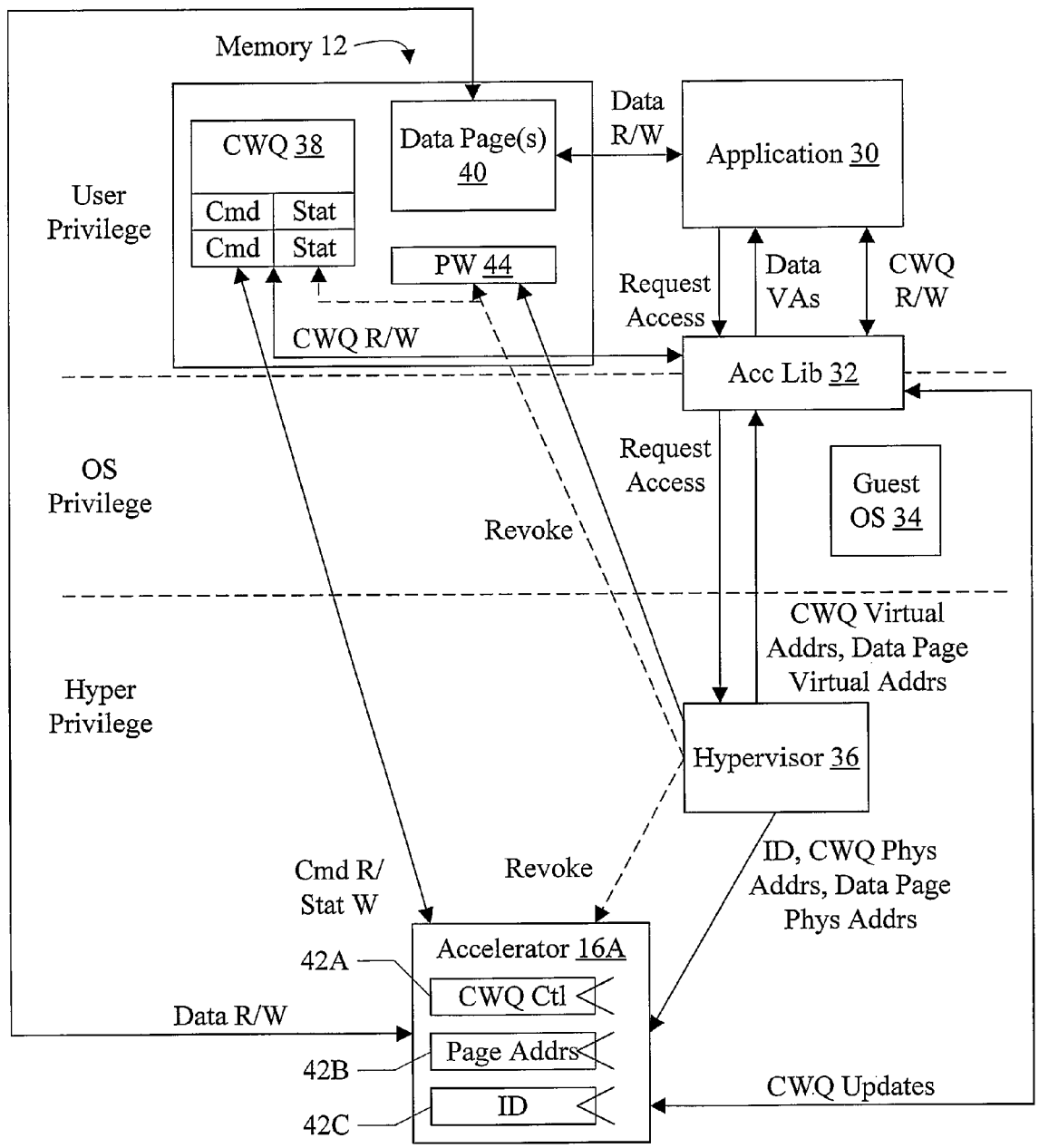
FIG. 2 is a block diagram of one embodiment of various software that may be executed on the CMT of FIG. 1 and may interface to the hardware accelerator shown in FIG. 1.

Turning now to FIG. 2, a block diagram is shown illustrating various software that may execute in a system including the CMT 10 shown in FIG. 1 and which may interface to a hardware accelerator in the CMT 10 shown in FIG. 1 (e.g. the hardware accelerator 16A) for one embodiment. Specifically, the software components shown include an application 30, an accelerator library 32, a guest operating system (OS) 34, and a Hypervisor 36. Each software component may comprise instructions which, when executed, implement the operation described for that component. Furthermore, each software component may comprise one or more processes, each of which may comprise one or more threads.

Also shown in FIG. 2 is a portion of the memory 12 that is accessible to the application 30. The portion shown in FIG. 2 may be allocated to the application 30 by the guest OS 34 and/or the Hypervisor 36. The application may be executed with address translation enabled, and thus may generate virtual addresses to access the memory. The virtual addresses are translated through the MT core's translation hardware to a physical address that actually identifies the memory locations in memory. The translations may be managed by the OS 34 and/or the Hypervisor 36, and may be stored in translation tables in memory 12 (not shown in FIG. 2). The translations may be loaded into translation hardware (such as a translation lookaside buffer, or TLB) in the MT cores for use during instruction execution. Generally, the translation may be performed at a page level of granularity, where a page may have any desired size (e.g. 4 kilobytes (KB), 8 KB, up to Megabytes or even larger) aligned to a page boundary in the memory address space. The portion of memory 12 allocated for use by the application may be referred to as user memory, since threads executing with the user privilege level can access the memory.

Three privilege levels are illustrated in FIG. 2: the user privilege level, the OS privilege level, and the Hyperprivilege level. The horizontal dotted lines between the privilege levels divide the software executing at each privilege level. Generally, privilege levels may be supported by the MT cores and the more privileged levels (e.g. OS privilege level and Hyperprivilege level) may have access to more processor and system resources than the less privileged levels have. For example, some control registers in the MT cores may be restricted to reading/writing only by instructions executing at the higher privilege levels (i.e. the more-privileged levels). Some instructions may only be executed at certain privilege levels. The use of privilege levels may aid in the controlling software (e.g. the OS 34 and/or the Hypervisor 36) being able to retain control of application programs such as the application 30.

The accelerator library 32 is illustrated as straddling the line between the user privilege level and the OS privilege level. The accelerator library 32 may execute entirely in the user level, or some threads may execute in the user level and some in the OS level, in various embodiments. The accelerator library 32, however, may be provided with the OS so that it can be shared by different applications. In other embodiments, the accelerator library 32 may not be provided and the application 30 may implement the operation of the accelerator library 32.

The accelerator library 32 may provide an application programming interface (API) for the application 30 to access the hardware accelerator 16A. The accelerator library 32 may include at least one user-privileged thread that manages the interface to the hardware accelerator 16A. Generally, the accelerator library 32 may request access to the hardware accelerator 16A from a higher-privileged thread (e.g. the Hypervisor 36, in this embodiment). Once access is granted, the accelerator library 32 may communicate commands to perform tasks to the hardware accelerator 16A without intervention by the Hypervisor 36. Thus, the software overhead of communicating with the Hypervisor 36 may be incurred to obtain access to the hardware accelerator 16A, but then may not be incurred for subsequent commands as long as the access is not revoked by the Hypervisor 36. Shared access to the hardware accelerator 16A may still be controlled by the Hypervisor 36 (which still has visibility to requests from other applications, even in other guests using other guest OSs), and thus fairness and security may be maintained. However, the overhead on a per-command basis may be reduced. Smaller tasks may be dispatched to the hardware accelerator 16A, in some embodiments, since the software overhead may be amortized across multiple tasks.

Specifically, in this embodiment, the accelerator library 32 may queue commands to perform tasks from the application 30 for the accelerator 16A in a command word queue (CWQ) 38 in the user-privileged memory. The accelerator 16A may be configured to read commands from the CWQ 38 and to write status to the CWQ 38. Thus, the command write/status read by the accelerator library 32 need not traverse the layers of privileged software to reach privileged memory or the hardware accelerator 16A itself.

As illustrated in FIG. 2, the application 30 may request access to the hardware accelerator 30 by making an API call to the accelerator library 32, as illustrated by the "Request Access" arrow from the application 30 to the accelerator library 32. The accelerator library 32 may pass the access request to the Hypervisor 36, as illustrated by the "Request Access" arrow from the accelerator library 32 to the Hypervisor 36. In some embodiments, the request may pass through the guest OS 34 as well.

If the Hypervisor 36 grants the request, the Hypervisor 36 may return the virtual address of the CWQ 38, as well as the virtual address(es) of one or more data pages 40 used to communicate the data to the hardware accelerator 16A, to the accelerator library 32. In one embodiment, the accelerator library 32 and/or the application 30 may request certain virtual addresses for the CWQ 38 and/or the data pages 40. Particularly, requesting the virtual addresses for the data pages 40 may permit the input data for the task to be placed in the data pages 40 before making the request. The accelerator library 32 may provide the virtual addresses of the data pages 40 to the application 30.

Additionally, in response to granting the request, the Hypervisor 36 may provide an identifier of the requesting process (e.g. thread identifier, process identifier, etc.) to the accelerator 16A, so that the accelerator 16A may determine that a command is sourced by a permitted thread. The Hypervisor 36 may further provide physical page addresses of the CWQ 38 and the data pages 40 to the accelerator 16A, so the accelerator 16A may locate the CWQ 38 and the data pages 40 in the user memory. In one embodiment, the CWQ 38 and the data pages 40 may be pinned in the memory 12, since the accelerator 16A effectively is caching the result of translating the virtual addresses to the CWQ 38 and the data pages 40. In the illustrated embodiment, the accelerator 16A may comprise control registers 42A-42C to store CWQ control data (including the physical address of the CWQ, head and tail pointers, etc.), page addresses of the data pages 40, and the identifier of the granted thread.

In this embodiment, the Hypervisor 36 may also manage a permission word (e.g. reference numeral 44 in FIG. 2) that indicates whether or not permission to access the accelerator 16A is granted to the application 30. The permission word 44 may be checked periodically to ensure that the application 30 still has access to the accelerator 16A.

The application 30 may write data to the data pages 40, and when data is ready for a task, the application 30 may write a command to the accelerator 16A via a call to the API of the accelerator library 32 ("CWQ R/W" from the application 30 to the accelerator library 32 in FIG. 2). The accelerator library 32 may write the command into a command field (Cmd) in the next available entry of the CWQ 38 ("CWQ R/W" from the accelerator library 32 to the CWQ 38 in FIG. 2), and may communicate the update to the accelerator 16A ("CWQ updates" arrow in FIG. 2). For example, the accelerator library 32 may increment the tail pointer to the CWQ 38, or may simply indicate that a command has been written. The accelerator 16A may read the command from the CWQ 38, process the data from the data pages 40, write results to the data pages 40, and update a status field in the CWQ 38. (Cmd R/Stat W and Data R/W in FIG. 2). The accelerator library 32 may poll the status field to determine when the command is complete. It is noted that, while the accelerator library 32 accesses the accelerator 16A on behalf of the application 30 in this embodiment, other embodiments are contemplated in which the application 30 is modified to access the accelerator 16A directly.

If the Hypervisor 36 revokes the access by the application 30 to the accelerator 16A (e.g. to service another request from a different application, not shown, or for other reasons), the Hypervisor 36 may update the permission word 44 and indicate the revocation to the accelerator 16A as well (dotted arrows in FIG. 2). The accelerator 16A may update the ID in the register 42C so that commands from the revoked application are no longer accepted. In one embodiment, the Hypervisor 36 may also update the status field in the CWQ 38, if a command is outstanding in the accelerator 16A when the revocation occurs.

The accelerator library 32 may also include software emulation of the hardware accelerator, in case the accelerator is not included in the system, is disabled, or is otherwise unavailable to the application 30.

The guest OS 34 may provide OS functionality in the system. In this embodiment, the guest OS 34 is executing in a virtualized environment provided by the Hypervisor 36, and there may be other guest OSs as well. In other embodiments, virtualization may not be implemented and the Hypervisor 36 may not be provided. In such cases, the functionality of managing shared access to the accelerator 16A described for the Hypervisor 36 herein may be implemented by the OS 34. Thus, in general, access to the accelerator 16A may be managed by a higher-privileged thread than the user-privileged thread that requests access and generates commands to the accelerator 16A.

In some embodiments, a CWQ 38 may be provided in more than one user-privileged address space at the same time (e.g. for different applications). The Hypervisor 36 or OS 34 may manage the granting of the accelerator 16A among the different threads, and commands from the CWQs may be processed as the accelerator 16A is granted to the corresponding user threads. That is, the Hypervisor 36 or OS 34 may grant the accelerator 16A to the various user threads in any arbitrary order, according to any desired scheme for arbitrating among the user threads.

Figure 3:
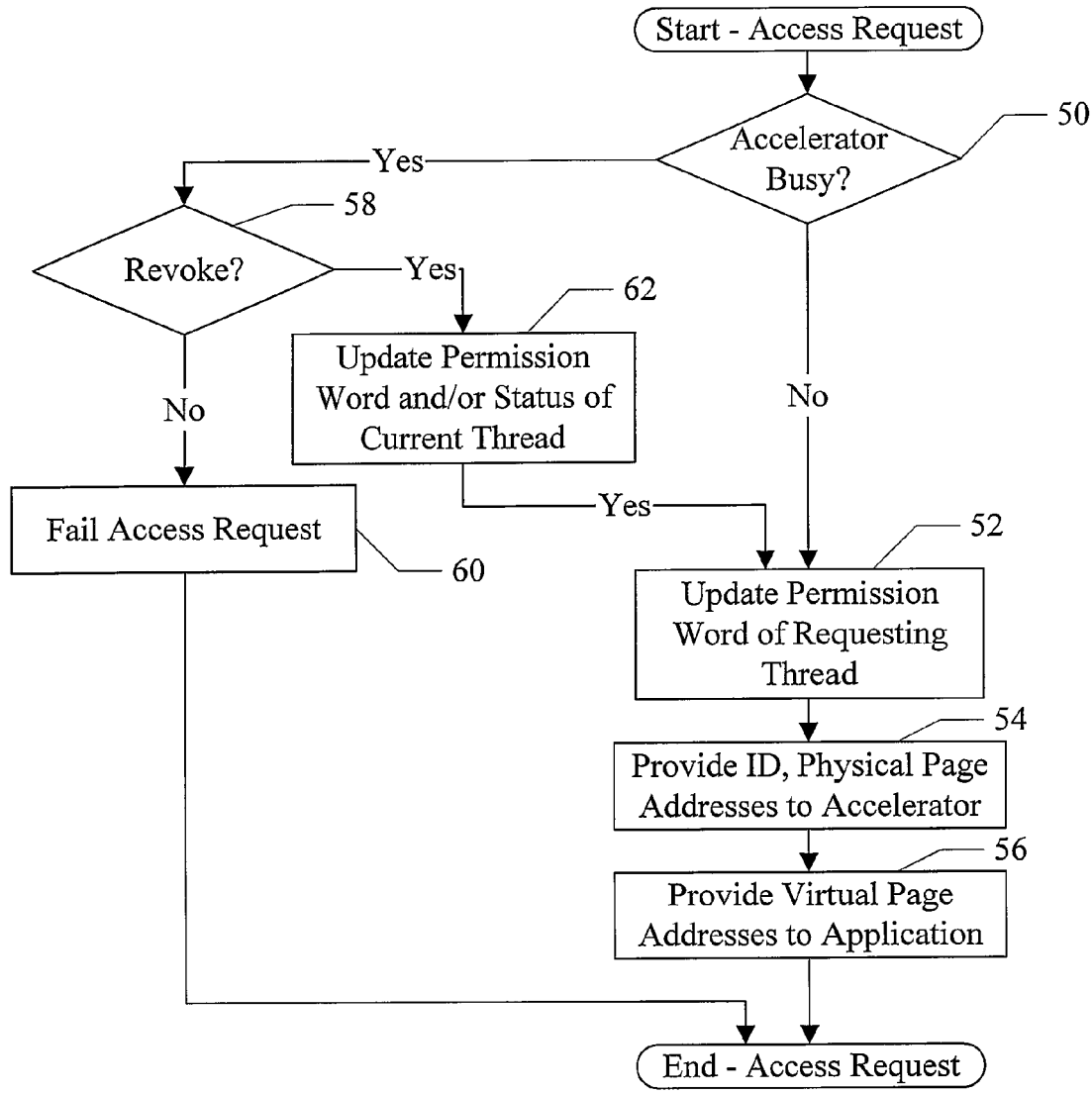
FIG. 3 is a flowchart illustrating one embodiment of an access request for the hardware accelerator.

Turning now to FIG. 3, a flowchart is shown illustrating operation of one embodiment of the Hypervisor 36 (or the OS 34, if the Hypervisor 36 is not included) in response to a user-privileged request for access to the accelerator 16A (e.g. from the accelerator library 32, in the embodiment of FIG. 2). While the blocks are shown in a particular order for ease of understanding, other orders may be used. The Hypervisor 36 may comprise instructions which, when executed, implement the operation illustrated by the flowchart of FIG. 3.

The Hypervisor 36 may determine if the accelerator 16A is busy (that is, currently granted to another user-privileged thread). If the accelerator 16A is not busy (decision block 50, "no" leg), the Hypervisor 36 may update the permission word 44 in the memory assigned to the requesting thread to indicate that the thread is permitted to access the accelerator 16A (block 52). The Hypervisor 36 may provide the ID for the granted thread and the physical page addresses of the CWQ 38 and the data pages 40 to the accelerator 16A (block 54). The Hypervisor 36 may return the virtual page addresses (mapping to the physical page addresses) to the requesting thread (block 56). An indication that the request was successful may also be returned.

If the accelerator 16A is busy (decision block 50, "yes" leg), the Hypervisor 36 may determine if the access by the other thread is to be revoked (decision block 58). Various factors may be considered in the decision. For example, balancing access to the accelerator 16A among the threads may be considered. Additionally, the length of time that the thread has been granted access to the accelerator 16A may be considered. It may be desirable to ensure that access is granted for at least a minimum period of time to overcome the software overhead incurred to gain access. If access is not revoked (decision block 58, "no" leg), the Hypervisor 36 may fail the access request (block 60). For example, an indication that the request was unsuccessful may be returned to the requestor. If the accelerator library 32 transmitted the request and has emulation functionality, the accelerator library 32 may emulate operation of the accelerator 16A so that the application 30 makes progress even though the accelerator 16A is busy serving another user-privileged thread. On the other hand, if access is revoked (decision block 58, "yes" leg), the Hypervisor 36 may update the permission word 44 in the revoked thread's memory, so that the revoked thread may detect the revocation (block 62). If the revoked thread had a command outstanding, the status field in the CWQ 38 may also be updated to indicate that the command was not completed due to revocation of access. The Hypervisor 36 may also update the permission word and provide the addresses and IDs for the newly-granted thread (blocks 52, 54, and 56).

Figure 4:
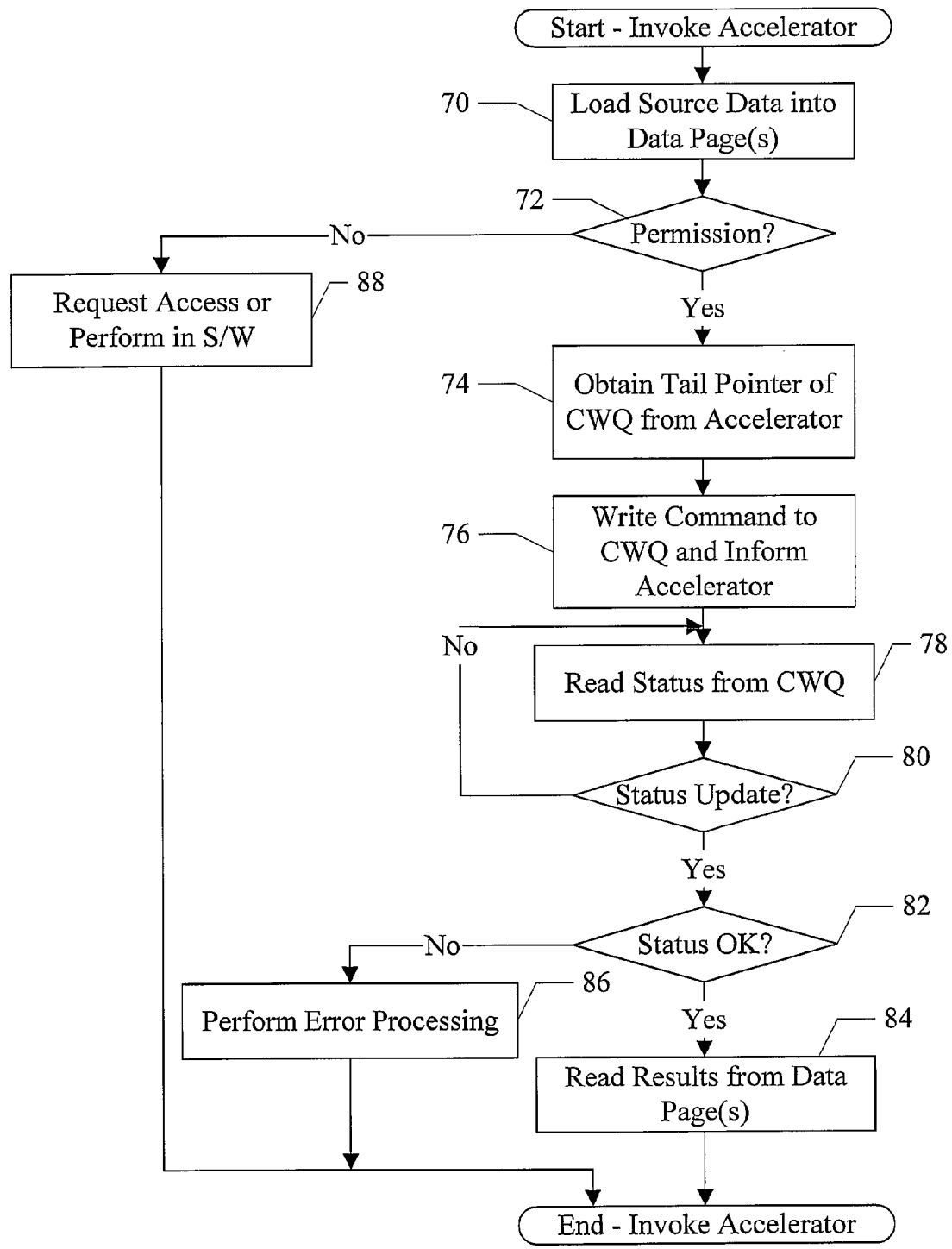
FIG. 4 is a flowchart illustrating one embodiment of invoking the hardware accelerator to perform a task.

Turning now to FIG. 4, a flowchart is shown illustrating operation of one embodiment of the application 30 and/or the accelerator library 32 to invoke the accelerator 16A to perform a task. While the blocks are shown in a particular order for ease of understanding, other orders may be used. The application 30 and/or accelerator library 32 may comprise instructions which, when executed, implement the operation illustrated by the flowchart of FIG. 4.

The application 30 may load the source data (on which the task is to be performed by the accelerator 16A) into the data pages 40 (block 70). In some cases, the source data may already be stored in the data pages 40 (e.g. by intelligent placement of the data, requesting that the virtual addresses at which the data is stored be used for the data pages 40, etc.). Accordingly, block 70 may not be needed in some cases.

The application 30 may transmit a command to the accelerator library 32. The accelerator library 32 may determine if the application 30 still has permission to access the accelerator 16A (e.g. by checking the permission word 44). If permission is still granted (decision block 72, "yes" leg), the accelerator library 32 may obtain the current tail pointer of the CWQ 38 from the accelerator 16A (block 74). Alternatively, the accelerator library 32 may retain a local copy of the tail pointer (e.g. in the memory 12). The accelerator library 32 may write the command to the CWQ 38, at the entry indicated by the tail pointer (block 76) and may inform the accelerator 16A that a new command is available for processing. For example, the accelerator library 32 may increment the tail pointer maintained by the accelerator 16A. The accelerator library 32 may poll the status field of the entry in the CWQ 38 until a status update is detected (block 78 and decision block 80, "no" leg). Once the status update is detected (decision block 80, "yes" leg), the accelerator library 32 may process the status to determine if the task completed successful or an error is detected. If an error is not detected (decision block 82, "no" leg), the accelerator library 32 may inform the application 30 that the operation is completed. In some embodiments, the application 30 may read the task results from the data pages 40 (block 84). If an error is detected (decision block 82, "yes" leg), the accelerator library 32 may perform error processing, dependent on the detected error (block 86). For example, if the error is that the task was terminated because access was revoked, the accelerator library 32 may perform the task in software. If the error was detection of an event that the accelerator 16A is not designed to handle, again the data may be processed in software. Other errors may be handled by the application 30 in an application-dependent fashion.

If permission has been revoked (decision block 72, "no" leg), the accelerator library 32 may request access to the accelerator 16A again, perform the task in software, request access and perform the task in software if access is not granted, or even indicate that permission has been revoked to the application 30, which may take action as appropriate (block 88).

Figure 5:
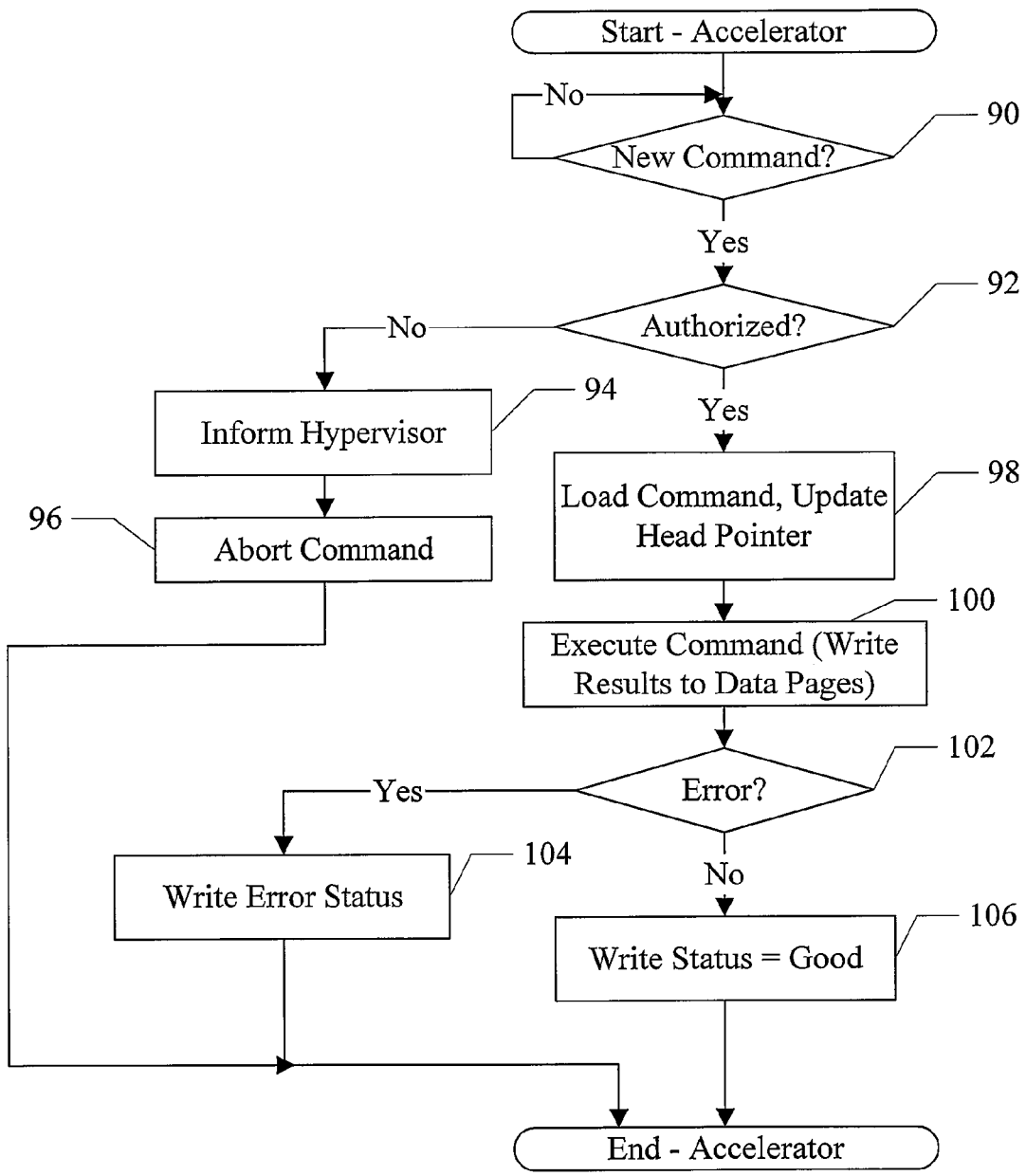
FIG. 5 is a flowchart illustrating operation of one embodiment of the accelerator.

Turning now to FIG. 5, a flowchart is shown illustrating operation of one embodiment of the accelerator 16A. While the blocks are shown in a particular order for ease of understanding, blocks may be performed in other orders. Blocks may be performed in parallel in combinatorial logic circuitry in the accelerator 16A. Blocks, combinations, of blocks, and/ or the flowchart as a whole may be pipelined over multiple clock cycles. In some embodiments, the accelerator 16A may be powered down if not in use, to conserve power. In such embodiments, the accelerator 16A may be "woken up" (powered up and initialized for use) before performing the operation shown in FIG. 5.

If a new command has not be written to the CWQ 38, the accelerator 16A may be idle (decision block 90, "no" leg). If a new command has been written to the CWQ 38 (decision block 90, "yes" leg), the accelerator 16A may determine if the thread that transmitted the command is authorized to access the accelerator 16A (decision block 92), e.g., by comparing the ID provided by the Hypervisor 36 to corresponding identification data in the CWQ 38 or in the communication indicating an update to the CWQ 38. If the command is not from an authorized source (decision block 92, "no" leg), the accelerator 16A may inform the Hypervisor 36 (block 94) and abort the command (block 96). The mechanism for informing the Hypervisor 36 is implementation dependent (e.g. by comparing the ID provided by the Hypervisor 36 to the ID associated with the communication indicating an update to the CWQ 38).

If the command is from an authorized source (decision block 92, "yes" leg), the accelerator 16A may load the command from the CWQ 38 and update the head pointer (block 98). The command may include pointers to the data to be processed in the data pages 40 and to the result area in the data pages 40 to which the results are to be written. The pointers may be offsets from a base address, and the accelerator 16A may thus be able to determine the physical addresses within the data pages 40. Alternatively, the pointers may be virtual addresses that the accelerator 16A maps to physical addresses provided when access was granted.

The accelerator 16A may execute the command, reading the source data and writing the result data (block 100). If an error is detected during the execution of the command (decision block 102, "yes" leg), the accelerator 16A may write the error code to the status field in the CWQ 38 (block 104). If no error is detected, a good status may be written to the status field (block 106). In some embodiments, operate in place may be supported, in which the source and result pages are the same physical pages, and the result overwrites the source.

It is noted that, in one embodiment, threads within a particular application 30 may share the same CWQ 38, if desired. In such embodiments, the accelerator library 32 may ensure that one thread accesses the CWQ 38 at any given point in time (e.g. using mutually exclusive locks, semaphores, etc.).

Figure 6:
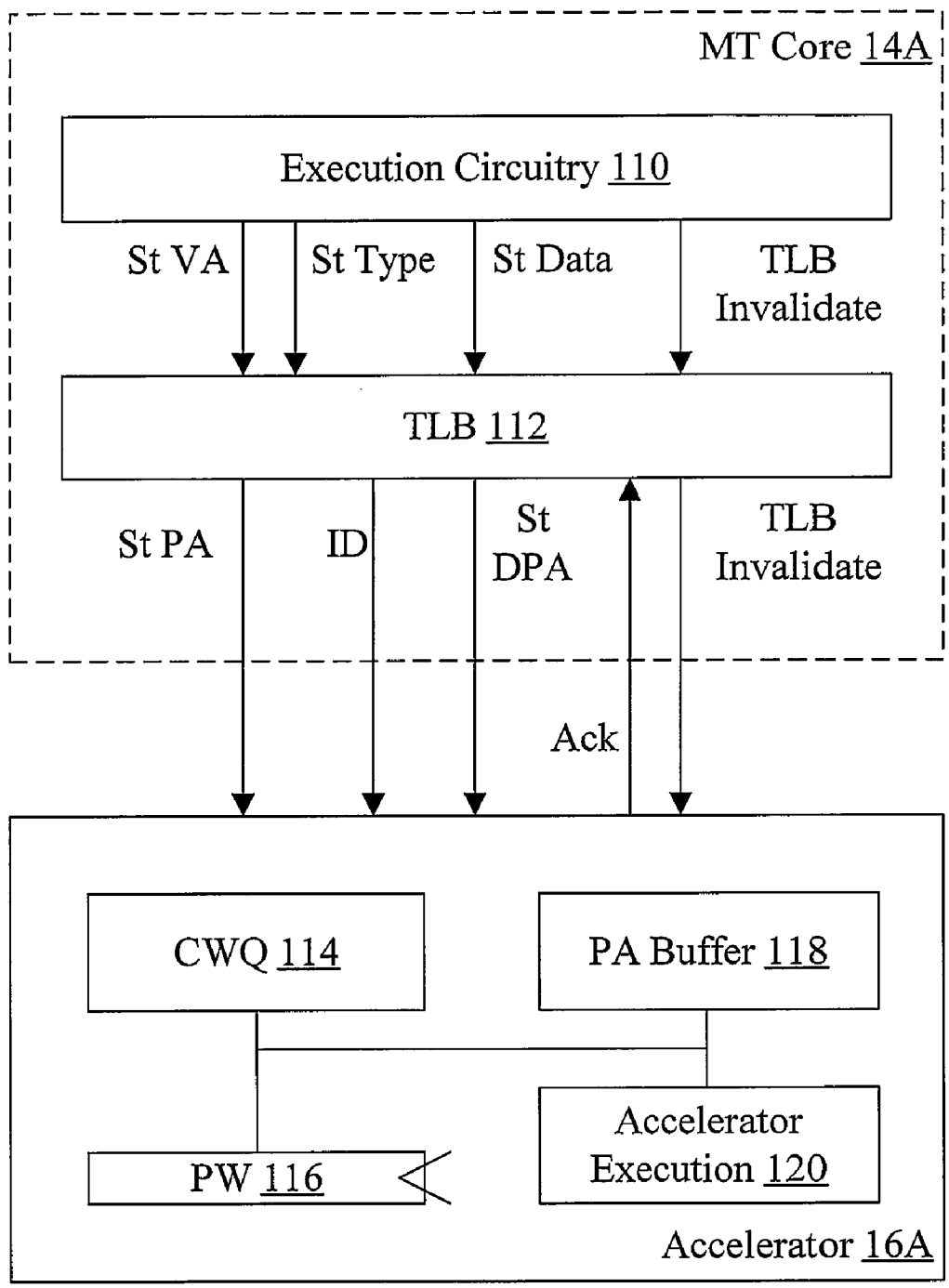
FIG. 6 is a block diagram illustrating details of another embodiment of a multi-threaded core and the hardware accelerator.

Turning now to FIG. 6, a block diagram of another embodiment of the MT core 14A and the accelerator 16A is shown. In this embodiment, the MT core 14A includes execution circuitry 110 coupled to a TLB 112. The accelerator 16A includes a CWQ 114, a permission word register 116, a physical address buffer 118, and accelerator execution circuitry 120. The CWQ 114, the permission word register 116, the physical address buffer 118, and the accelerator execution circuitry 120 are coupled.

FIG. 6 illustrates certain outputs of the TLB 112 being provided to the accelerator 16A. The view in FIG. 6 may be simplified. Generally, the accelerator 16A and the MT core 14A may be coupled in any direct or indirect fashion, as mentioned previously.

In the embodiment of FIG. 6, the TLB 112 may be configured to translate the data operand of a store instruction, in addition to its address, for certain types of stores. Specifically, the store type used to write commands to the CWQ 114 may cause the TLB 112 to translate the data operand of the store. The data operand may be a pointer to source data and/or a result location, and thus the pointer is a virtual address for the user-privileged thread that executes the store. By using the TLB 112 to translate the pointer, the MT core 14A may provide the physical address of the pointer to the accelerator 16A. Accordingly, pages need not be preallocated and pinned for the data to be transmitted back and forth between the accelerator 16A and the application 30. Rather, any addresses for which valid translations exist may be used. Moving data in and out of the pinned pages may be avoided, in some embodiments. In other embodiments, the data pages may still be pinned if desired.

The execution circuitry 110 may generally include the circuitry to fetch and execute instructions in the instruction set architecture implemented by the MT core 14A. For store instructions, the execution circuitry 110 may generate a store virtual address for the target memory location of the store (St VA in FIG. 6). The store instruction may include one or more address operands, which may be added to produce the store virtual address. Additionally, the execution circuitry 110 may transmit the store type (St Type in FIG. 6) to the TLB 112, so that the TLB 112 may determine if the data is to be translated for this embodiment. Additionally, the execution circuitry transmit the store data operation (St Data in FIG. 6).

The TLB 112 stores translation mappings from virtual addresses to physical addresses. The TLB 112 may have any construction and capacity. Particularly, the TLB 112 may provide both the store virtual address and the store data translation in a variety of ways. For example, the TLB 112 may include two or more address ports, and may use one port to translate the store virtual address and another port to translate the store data. Alternatively, the store virtual address may be translated first on a port, and then the store data may be translated in the following clock cycle using the same port. In one implementation that uses a single port, the TLB 112 and/or related hardware in the execution circuitry 10 may be configured to prevent and/or resolve conflicts for access to the TLB port. Alternatively, software may schedule stores so that conflicts in accessing the TLB 112 do not occur, or the latency of the accelerator may ensure that no conflicts can occur.

In response to the store virtual address, the TLB 112 may detect a TLB hit and output the store physical address (St PA in FIG. 6). In response to the store type and the store data, the TLB 112 may detect a TLB hit and output a data physical address (St DPA). An identifier indicating the thread that initiated the store may also be supplied. For example, the identifier may be the thread ID and/or the process ID, in one embodiment. In one embodiment, the identifier may further include an OS identifier identifying which guest OS 34 is associated with the thread. In addition to providing the store physical address to the accelerator 16A, the TLB 112 may provide the store physical address back to the execution circuitry 110 (e.g. for cache access, memory access, etc.)

If either the store VA or the store data (if translated) is a TLB miss, a hardware tablewalker may be invoked to search the software-managed translation tables for a translation. If a translation is found, it may be loaded into the TLB 112 and the store instruction may be reexecuted. If a translation is not found, an exception may occur. In other embodiments, a hardware table walker is not included and an exception may occur in response to the TLB miss to load the desired translation into the TLB 112. In some embodiments, a TLB miss on the store data may not cause the TLB to be loaded in response to the miss or an exception to be taken to service the miss. Rather, the store data may be supplied unmodified to the target, and may be marked as untranslated. If the accelerator 16A is to treat the store data as an address and it is marked as untranslated, the accelerator 16A may signal an error for the task and software may then take corrective action. Such an embodiment may be used, e.g., if some stores to the accelerator 16A provide pointers (and thus need translation) and other stores to the accelerator 16A provide control data that does not need to be translated.

The store type may indicate whether or not the store is targeted at the accelerator 16A (and thus may be used to determine if the data operand is to be translated by the TLB 112). The store type may be defined in a variety of fashions. In one embodiment, the SPARC™ instruction set architecture may be implemented and the store type may comprise the address space identifier (ASI) of the store. Other embodiments may use different instruction encodings (e.g. opcodes) to define store types. Still other embodiments may use a virtual address range of the store virtual address to determine the store type (e.g. the virtual address range mapped to the accelerator 16A may be defined to be one store type, and other ranges may be defined to be one or more other store types). In the case of the address range, the range may be programmable or may be fixed. In the case of the address range, the execution circuitry 110 may decode the store virtual address to detect the store type, or the TLB 112 may detect it. In still other embodiments, a range of the physical addresses may be used and the store type detection may occur after the translation by the TLB 112. The TLB 112 may also provide translations for load instructions (not shown in FIG. 6).

The store physical address and the store data physical address may be conveyed to the accelerator 16A in the form of a normal store operation (e.g. the store physical address may be conveyed as the address of the store operation, and the store data physical address may be conveyed as the store data). Based on the target of the store operation, the accelerator 16A may be able to determine that the store data is an address. For example, if the store writes a command (or part of a command) into the CWQ 114, the accelerator 16A may determine that the store data is a pointer to source data, control state, or target location depending on its location in the CWQ 114.

The CWQ 114 may be similar to the CWQ 38 shown in FIG. 2, except that the CWQ 114 is implemented in the accelerator 116A, in one embodiment. Thus, the accelerator 16A may control the head and tail pointers, and the MT core 14A may write a set of addresses to write the tail entry in the queue. The permission word register 116 may store a permission word similar to the permission word 44 in FIG. 2. The accelerator library 32 may check the permission word, and the Hypervisor 36 may write the permission word, similar to the above description. The accelerator 16A may check the ID provided with a store against the permission word for stores that write into the CWQ 114. The accelerator execution circuitry 120 may perform the checking, and may read the commands for the CWQ 114 and perform the identified tasks.

Since the accelerator 16A is supplied with translated pointers through the TLB 112, the accelerator 16A may also need to be informed when a TLB invalidation (or shootdown) is being performed. The TLB invalidations are typically performed to invalidate translation data that has been deleted from the translation tables (e.g. by the OS 34 or the Hypervisor 36) to reclaim the page for other uses. The execution circuitry 110 may execute an instruction to invalidate a TLB entry or entries, and the TLB invalidate may be transmitted to the TLB 112. The TLB 112 may forward the TLB invalidate to the accelerator 16A, which may return an acknowledgement (Ack in FIG. 6) when the accelerator 16A has processed the invalidation. The TLB 112 may delay completion of the TLB invalidate until the acknowledgement is received from the accelerator 16A.

The TLB invalidate may occur at any level of granularity. For example, the invalidate may be for a single page, in which case the TLB 112 may transmit the physical address of the page being invalidated to the accelerator 16A. Alternatively, a TLB invalidate may invalidate all of the TLB, in which case the TLB 112 may signal that a TLB invalidate is occurring and the accelerator 16A may invalidate all pages. If TLB invalidations are deemed infrequent enough, the TLB 112 may signal a TLB invalidation and the accelerator 16A may invalidate all pages in response to any TLB invalidate.

The physical address buffer 118 may store physical addresses that the accelerator 16A currently has access to (e.g. as part of a current task, or as part of a task queued in the CWQ 114). The physical address buffer 118 may be used to detect that a TLB invalidate affects one or more tasks that have been dispatched to the accelerator 16A. If a physical address is invalidated in the physical address buffer 118, the corresponding task or tasks that access data at the physical address are affected. The accelerator execution circuitry 120 may abort a task that is pending in the CWQ 114 (updating that status to indicate abort so that software may determine why the task is not performed). If the task is in-flight, it may be selectively aborted. For example, if the task is in-place (overwriting source data with result data), the task may not be aborted because it may be difficult to recover the input data and complete the task.

Figure 7:
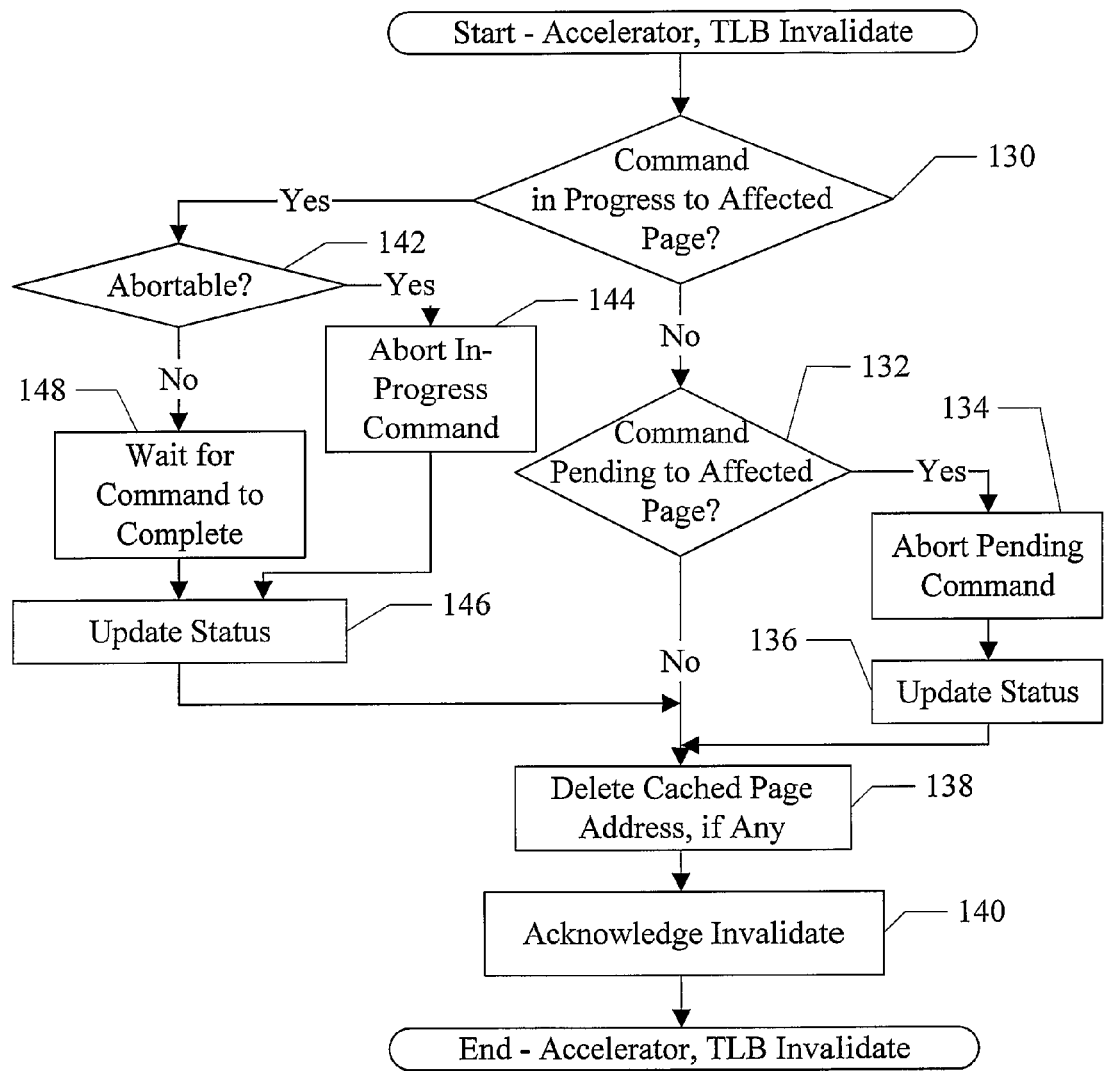
FIG. 7 is a flowchart illustrating operation of an embodiment of the accelerator shown in FIG. 6.

FIG. 7 is a flowchart illustrating operation of one embodiment of the accelerator 16A (and more particularly the accelerator execution circuitry 120) for performing a TLB invalidate. While the blocks are shown in a particular order for ease of understanding, blocks may be performed in other orders. Blocks may be performed in parallel in combinatorial logic circuitry in the accelerator 16A. Blocks, combinations, of blocks, and/or the flowchart as a whole may be pipelined over multiple clock cycles.

If the TLB invalidate does not affect a page used by a command that is in progress (decision block 130, "no" leg), then the TLB invalidate may affect a command that is pending in the CWQ 114. If so (decision block 132, "yes" leg), the accelerator 16A may abort the pending command (block 134), and update the status of the aborted entry to indicate that the command was aborted (block 136). If not (decision block 132, "no" leg), then no update is needed in response to the TLB invalidate. In either case, the accelerator 16A may delete the cached page address(es) affected by the TLB invalidate from the physical address buffer 118 (block 138), and may acknowledge the TLB invalidate (block 140). The accelerator 16A may handle the aborted commands in any fashion. For example, the aborted commands may be skipped without consuming accelerator resources subsequent to the skip (i.e. temporarily consumed resources may be freed).

If the TLB invalidate affects a page used by a command that is in progress (decision block 130, "yes" leg), the accelerator 16A may determine if the in-progress command is abortable (decision block 142). If the in-progress command is abortable (decision block 142, "yes" leg), the accelerator 16A may abort the command (block 144) and may update the status in the CWQ 114 to indicate that the command was aborted (block 146). If the in-progress command is not abortable (decision block 142, "no" leg), the accelerator 16A may wait for the command to complete (block 148) and update the status in the CWQ 114 to indicate that the command completed successfully (block 146). The accelerator 16A may delete the cached page address(es) affected by the TLB invalidate from the physical address buffer 118 (block 138), and may acknowledge the TLB invalidate (block 140).

As mentioned above, a command that performs in-place processing may not be abortable, in one embodiment. In other embodiments, there may be other reasons that a command is not abortable. For example, if the command is almost completed, it may be a better performance choice to complete the processing rather than abort. If aborting would leave sensitive information (e.g. a password, an encryption key, etc.) available unprotected in memory, the command may not be aborted until the sensitive information is no longer available. Any set of one or more non-abortable conditions may be implemented in various embodiments.

Figure 8:
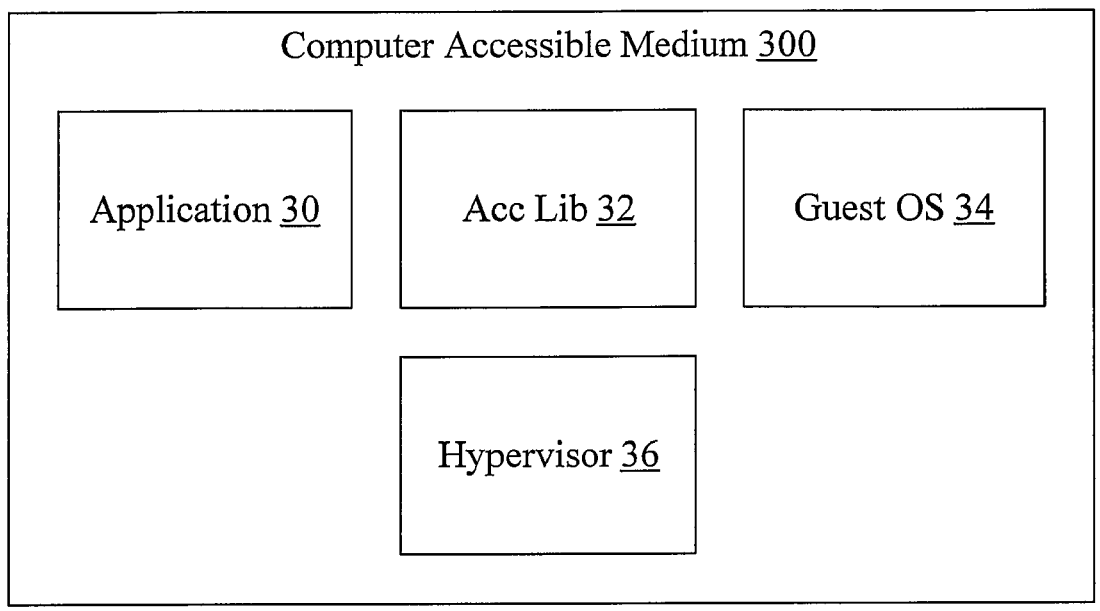
FIG. 8 is a block diagram of a computer accessible medium.

Turning now to FIG. 8, a block diagram of a computer accessible medium 300 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., microelectromechanical systems (MEMS), as well as media accessible via transmission media or signals such as electrical, electromagnetic, or digital signals, conveyed via a communication medium such as a network and/or a wireless link. The computer accessible medium 300 in FIG. 8 may store one or more of the application 30, the accelerator library 32, the guest OS 34, and/or the Hypervisor 36. Generally, the computer accessible medium 300 may store any set of instructions which, when executed, implement a portion or all of the flowcharts shown in one or more of FIGS. 3-5, and 7.

Numerous variations and modifications will become apparent to those skilled in the art once the above disclosure is fully appreciated. It is intended that the following claims be interpreted to embrace all such variations and modifications.

What is claimed is:

1. A processor comprising:
   execution circuitry configured to execute a store instruction having one or more address operands and a data operand, wherein the execution circuitry is configured to generate a virtual address from the one or more address operands during execution of the store instruction, and wherein the execution circuitry is configured to transmit the virtual address and the data operand to a translation lookaside buffer (TLB); and
   the TLB coupled to receive the virtual address and configured to translate the virtual address to a first physical address, and wherein the TLB is further coupled to receive the data operand and to translate the data operand to a second physical address responsive to the store instruction targeting a hardware accelerator, and wherein the processor is configured to transmit the first physical address and the second physical address as the address and data of a store operation to the hardware accelerator targeted by the store instruction, and wherein the processor is configured to transmit the first physical address and the data operand as the address and data of the store operation to a memory controller to access memory responsive to the store instruction targeting memory instead of the hardware accelerator.

2. The processor as recited in claim 1 wherein the store instruction targets a queue in the hardware accelerator that is configured to hold one or more commands for the hardware accelerator.

3. The processor as recited in claim 1 wherein the target is determined based on a store type corresponding to the store instruction.

4. The processor as recited in claim 3 wherein the store type is indicate by an address space identifier associated with the store instruction.

5. The processor as recited in claim 1 wherein the execution circuitry is further configured to initiate a TLB invalidation, and wherein the TLB is configured to communicate an indication of the TLB invalidation to the hardware accelerator.

6. The processor as recited in claim 5 wherein the TLB is coupled to receive an acknowledgement of the TLB invalidation from the hardware accelerator, and wherein the TLB is configured to complete the TLB invalidation responsive to receiving the acknowledgement.

7. A hardware accelerator coupled to receive an indication of a translation lookaside buffer (TLB) invalidation from a processor to which the hardware accelerator is couplable, the hardware accelerator comprising:
   a physical address buffer configured to store one or more physical addresses corresponding to memory locations being accessed by the hardware accelerator; and
   accelerator execution circuitry coupled to the physical address buffer and configured to perform one or more tasks assigned to the hardware accelerator, wherein the accelerator execution circuitry is configured to transmit an acknowledgement in response to the TLB invalidation indication, responsive to invalidating physical addresses in the physical address buffer that are affected by the TLB invalidation, and wherein the accelerator execution circuitry is configured to determine whether or not a command being processed by the accelerator execution circuitry is abortable, and wherein the accelerator execution circuitry is configured to delay transmission of the acknowledgement until the command is completed responsive to determining that the command being processed is not abortable, and wherein the accelerator execution circuitry is configured to abort processing of the command and transmit the acknowledgement without delay responsive to determining that the command is abortable.

8. The hardware accelerator as recited in claim 7 wherein a command that reads or writes an affected page is abortable.

9. The hardware accelerator as recited in claim 7 wherein the hardware accelerator is further configured to maintain a permission word indicating which thread or threads has permission to access the hardware accelerator.

10. A method comprising:
    executing a store instruction having one or more address operands and a data operand, wherein the executing comprises generating a virtual address from the one or more address operands;
    translating the virtual address to a first physical address;
    selectively translating the data operand to a second physical address dependent on whether or not the store instruction targets a hardware accelerator;
    transmitting the first physical address and the second physical address as the address and data of a store operation to the hardware accelerator responsive to determining that the store instruction targets the hardware accelerator; and
    transmitting the first physical address and the data operand to a memory controller responsive to determining that the store instruction targets a memory location in a memory to which the memory controller is coupled, wherein the store instruction targets the memory location instead of the hardware accelerator.

11. The method as recited in claim 10 wherein the store instruction targets a queue in the hardware accelerator that is configured to hold one or more commands for the hardware accelerator.

12. The method as recited in claim 10 further comprising determining the target of the store instruction based on a store type corresponding to the store instruction.

13. The method as recited in claim 12 wherein the store type is indicated by an address space identifier associated with the store instruction.

14. The method as recited in claim 10 further comprising initiating a TLB invalidation; and communicating an indication of the TLB invalidation to the hardware accelerator.

15. The method as recited in claim 14 further comprising the hardware accelerator invalidating any physical page addresses affected by the TLB invalidation and stored in the hardware accelerator responsive to the indication of the TLB invalidation, and providing an acknowledgement in response to the indication.

16. The method as recited in claim 15 further comprising delaying the acknowledgement until an unabortable command completes.

17. The method as recited in claim 15 further comprising aborting a command that accesses a page affected by the TLB invalidation.

18. The method as recited in claim 14 further comprising completing the TLB invalidation responsive to receiving the acknowledgement of the TLB invalidation from the hardware accelerator.

* * * * *